(12) United States Patent
McVay

(10) Patent No.: US 11,767,780 B2
(45) Date of Patent: Sep. 26, 2023

(54) ENGINE COOLING SYSTEM

(71) Applicant: The Charles Machine Works, Inc., Perry, OK (US)

(72) Inventor: Chester S. McVay, Stillwater, OK (US)

(73) Assignee: The Charles Machine Works, Inc., Perry, OK (US)

( * ) Notice: Subject to any disclaimer, the term of this patent is extended or adjusted under 35 U.S.C. 154(b) by 0 days.

(21) Appl. No.: 17/174,858

(22) Filed: Feb. 12, 2021

(65) Prior Publication Data

US 2021/0254528 A1 Aug. 19, 2021

Related U.S. Application Data

(60) Provisional application No. 62/975,833, filed on Feb. 13, 2020.

(51) Int. Cl.
| | | |
|---|---|---|
| *F01N 3/20* | (2006.01) | |
| *F01P 3/18* | (2006.01) | |
| *E21B 3/02* | (2006.01) | |

(52) U.S. Cl.
CPC ............ *F01N 3/2046* (2013.01); *E21B 3/02* (2013.01); *F01P 3/18* (2013.01)

(58) Field of Classification Search
CPC ...... F01N 3/2046; F01N 3/00; F01N 2340/00; F01N 2590/08; E21B 3/02; E21B 7/046; F01P 3/18; F01P 2001/005; Y02T 10/12
See application file for complete search history.

(56) References Cited

U.S. PATENT DOCUMENTS

| | | | |
|---|---|---|---|
| 6,074,153 A | 6/2000 | Allen | |
| 2012/0048631 A1* | 3/2012 | Shatters | B60K 11/06 180/68.1 |
| 2013/0068177 A1* | 3/2013 | Yotsuzuka | E02F 9/0866 123/41.58 |
| 2014/0260190 A1 | 9/2014 | DeGeorge | |
| 2015/0176451 A1 | 6/2015 | Tsutsumi et al. | |
| 2015/0275476 A1* | 10/2015 | Sakai | E02F 3/7631 172/701.1 |
| 2016/0194989 A1* | 7/2016 | Minoura | B60K 11/04 56/16.7 |
| 2016/0265194 A1* | 9/2016 | Ohmura | B60K 13/04 |
| 2016/0356191 A1* | 12/2016 | Campbell | E21B 7/046 |
| 2018/0257483 A1* | 9/2018 | Kuhn | F01N 3/055 |

* cited by examiner

*Primary Examiner* — Audrey B. Walter
*Assistant Examiner* — Dapinder Singh
(74) *Attorney, Agent, or Firm* — Tomlinson McKinstry, P.C.

(57) ABSTRACT

An engine cooling system comprising an exhaust enclosure formed in an engine compartment of a work machine. An exhaust processing system is situated within the exhaust enclosure. The exhaust enclosure is bounded in part by spaced upper and lower panels that are exposed to the ambient environment. At least one opening is formed in each panel. When an engine and fan also contained within the engine compartment are shut down, ambient air flows into the exhaust enclosure through the opening in the lower panel. The air flows around the exhaust processing system and back into the ambient environment through the opening formed in the upper panel.

22 Claims, 14 Drawing Sheets

ENGINE COOLING SYSTEM

SUMMARY

The present invention is directed to a self-propelled machine situated in an ambient environment. The self-propelled machine comprises an engine configured to propel the machine, an exhaust processing system, and exhaust stack, and an exhaust enclosure. The exhaust processing system is in fluid communication with the engine and is configured to chemically treat the engine's exhaust and generate a treated fluid stream. The exhaust stack is in fluid communication with the exhaust processing system and discharges into the ambient environment. The exhaust enclosure contains the exhaust processing system and is bounded by spaced upper and lower panels. Each panel is exposed to the ambient environment and has at least one opening formed therein that is distinct from any opening associated with the exhaust stack. The openings are situated along an airflow path that extends through the exhaust enclosure.

The present invention is also directed to a system comprising a drill rig situated in an ambient environment. The drill rig comprises an engine configured to propel the drill rig, an exhaust processing system, and an exhaust enclosure. The exhaust processing system is in fluid communication with the engine and is configured to chemically treat the engine's exhaust and generate a treated fluid stream. The exhaust enclosure contains the exhaust processing system and is bounded by spaced upper and lower panels. Each panel is exposed to the ambient environment and has at least one opening formed therein. The system further comprises air from the ambient environment flowing into the exhaust enclosure through the opening formed in the lower panel. The air flows around the exhaust processing system, and out of the exhaust enclosure and back into the ambient environment though the opening formed in the upper panel.

BACKGROUND

Construction machines often use internal combustion engines to drive their operation. Many of these machines use internal combustion engines that use diesel as a fuel source rather than gasoline. The exhaust from a diesel fueled engine may include oxidized nitrogen typically referred to as "NOx". NOx is considered by some environmental protection agencies and governmental entities to be an environmental hazard. Many such agencies and entities have adopted requirements that diesel engine emission of NOx be reduced to near zero levels. Thus, exhaust treatment systems have been developed to reduce the NOx emissions from diesel engines.

One such system is a Selective Catalytic Reduction (SCR) system. One SCR system is described in U.S. Pat. No. 8,071,037 owned by Cummins Filtration IP, Inc. In such SCR system, Diesel Exhaust Fluid (DEF) is injected into the exhaust gas and subsequently vaporizes and decomposes to carbon dioxide ($CO_2$) and ammonia ($NH_3$). The ammonia reacts with the NOx emissions in the SCR system and is catalytically reduced to nitrogen gas ($N_2$) and water vapor. The reduction process, however, requires the temperature of the exhaust gases to increase. For example, the exhaust gas temperatures can reach or exceed 1,500 degrees Fahrenheit and the surface temperature of certain components of the exhaust system can exceed 1,050 degrees Fahrenheit.

Several sensors and electronics are mounted to the exhaust system or mounted near the engine to monitor the function and control operation of the exhaust system. These components can become hot and malfunction if their temperature limits are exceeded. Because the machine is generally stationary during operation, there may not be adequate air flow over these sensitive components to keep the temperature of the surrounding air and the components in an acceptable range.

One solution which allows for adequate cooling of the engine and exhaust system on a stationary work machine is described in U.S. Pat. No. 10,100,579 issued to Campbell (the "Campbell" patent), the entire contents of which are incorporated herein by reference. Campbell provides for an exhaust area that extends horizontally within the engine compartment and comprises a plurality of barriers to restrict the flow of air between the engine area and the exhaust area. A conduit interconnects the fan with the exhaust area without communicating with the radiator area. While the engine is in operation, the fan vents the warm air from the exhaust area. Cooler outside air is then circulated into the exhaust area through cut outs located in the top cover of the exhaust area. The primary drawback of the system in Campbell is that air is only circulated while the fan is in operation. Once the fan shuts off, as is typically the case when shutting down the engine, the exhaust area can rapidly heat up. Therefore, a system is needed that continues to cool the exhaust area even after the engine is shut down.

DETAILED DESCRIPTION

Figure 1:
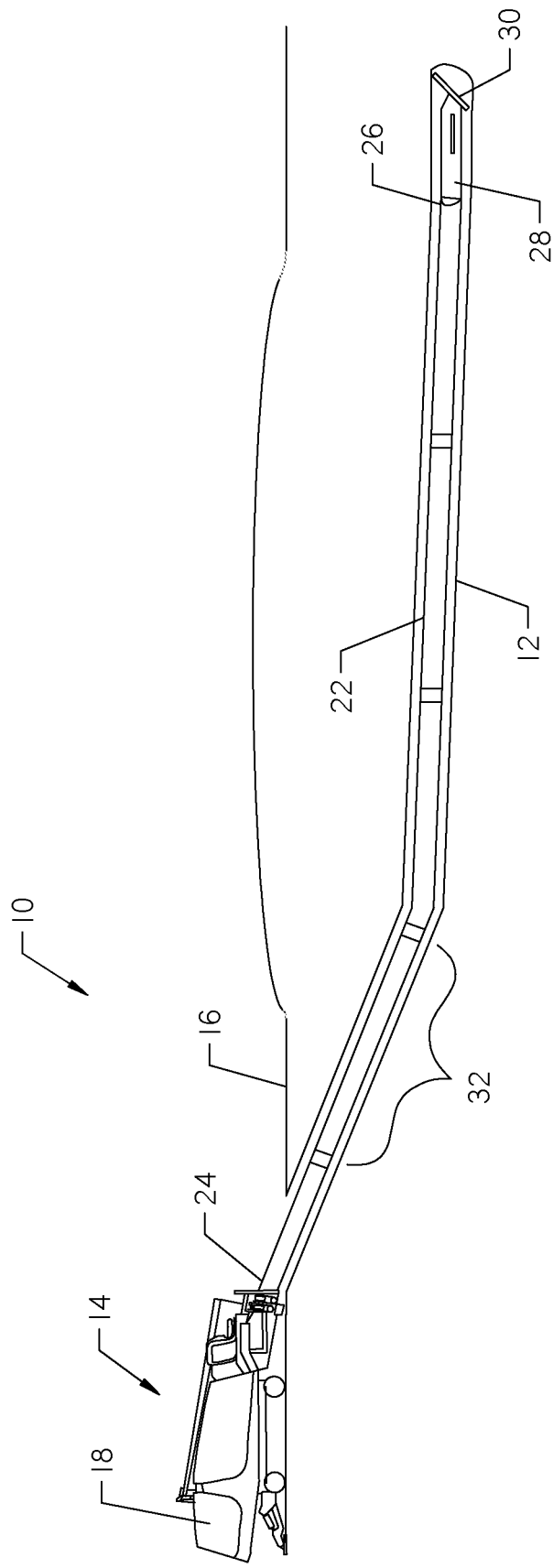
FIG. 1 is an illustration of a horizontal directional drilling operation.
Figure 4:
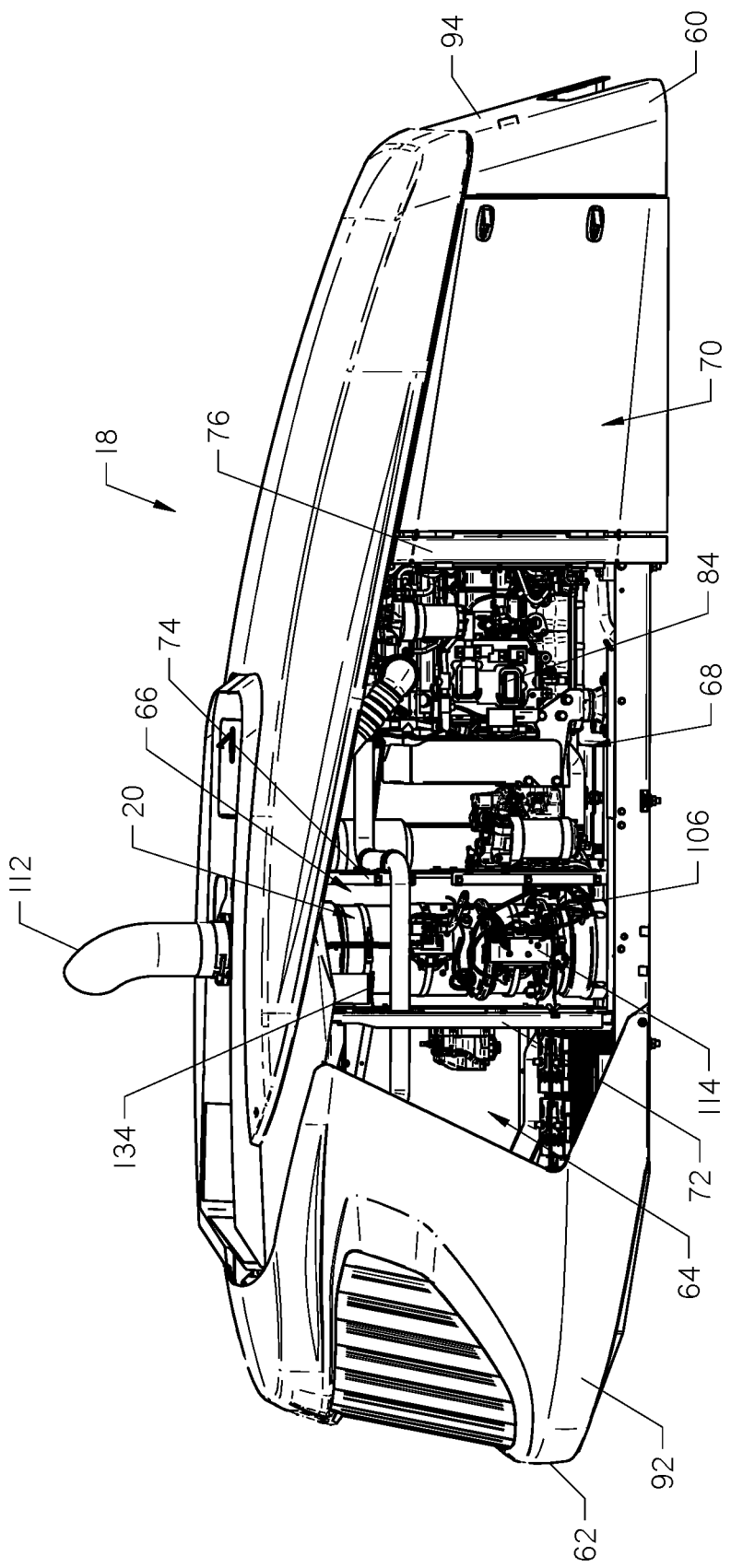
FIG. 4 is an elevational view of the first side of the engine compartment of the drill rig shown in FIG. 2. A portion of the lateral panels and a lateral barrier have been removed to expose the components situated within the engine compartment.

With reference to FIG. 1, a horizontal directional drilling system 10 is shown. The system 10 is used to create a borehole 12 under an above-ground obstacle, such as a roadway. The system 10 is powered by a drill rig 14 positioned on a ground surface 16 and operated by a rig operator. As will be described in more detail later herein, the drill rig 14 comprises an engine compartment 18. The engine compartment 18 disclosed herein is configured to cool an exhaust processing system 20 contained within the engine compartment 18, as shown in FIG. 4, after the drill rig 14 has been shut down or "keyed off".

Continuing with FIG. 1, the system 10 uses a drill string 22 having a first end 24 and a second end 26. The drill string 22 is attached to the drill rig 14 at its first end 24 and a downhole tool 28 at its second end 26. The downhole tool 28 supports a drill bit 30. The drill string 22 comprises a plurality of hollow pipe sections 32 arranged in an end-to-end relationship. The drill string 22 functions to transmit thrust and rotation force from the drill rig 14 to the drill bit 30 and deliver drilling fluid to the drill bit 30.

Figure 2:
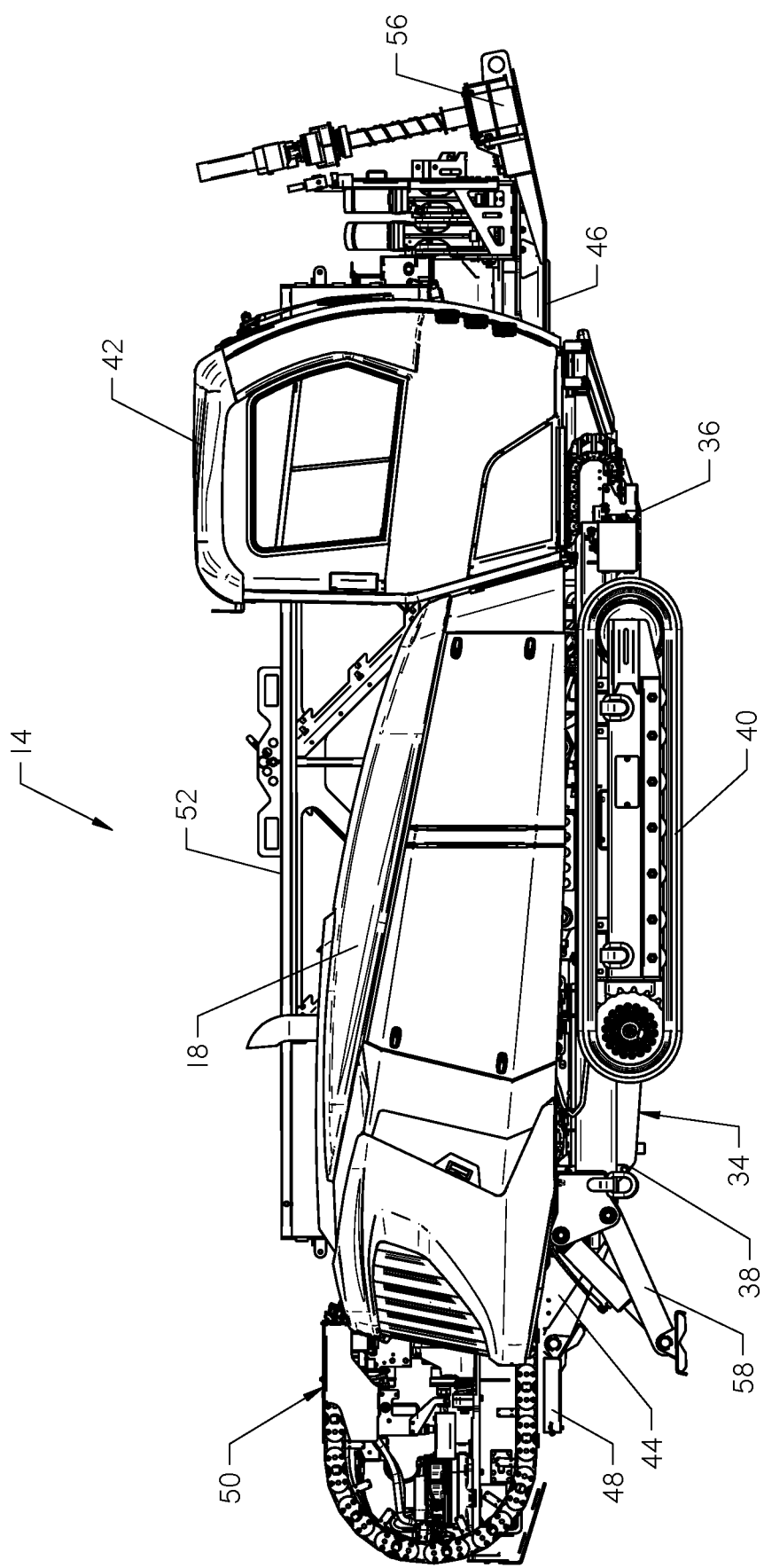
FIG. 2 is an elevational view of a first side of the drill rig shown in FIG. 1.
Figure 3:
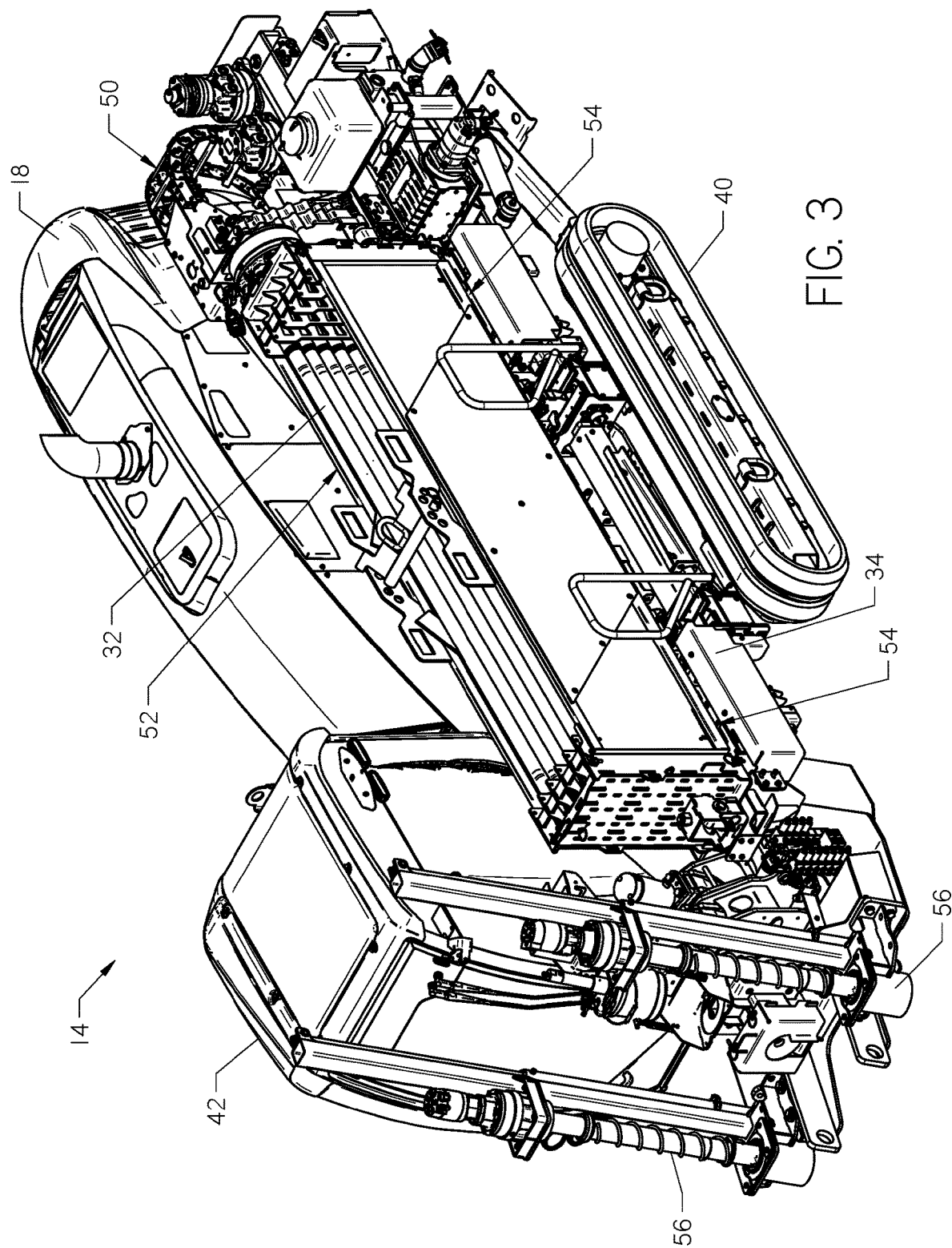
FIG. 3 is a perspective view of a second side of the drill rig shown in FIG. 2.

Turning to FIGS. 2 and 3, the drill rig 14 comprises a frame 34 having opposed first and second ends 36 and 38. The frame 34 is supported on a set of tracks 40 used to move the drill rig 14 from location to location. An operator station 42 is supported at the first end 36 of the frame 34. The rig operator controls the drill rig 14 from the operator station 42. The engine compartment 18 is supported on the frame 34 adjacent to the operator station 42.

Continuing with FIGS. 2 and 3, an elongate drill frame 44 having opposed first and second ends 46 and 48 is supported on the frame 44 adjacent the engine compartment 18. A carriage 50 is supported on the drill frame 44 and is movable along the drill frame 44 between its first and second ends 46 and 48. The carriage 50 is configured to attach and remove pipe sections 32 to and from the drill string 22. The pipe sections 32 are stored in a pipe box 52 supported on the frame 34. A pipe handling system 54, shown in FIG. 3, is supported on the frame 34 and is configured to shuttle pipe sections 32 between the carriage 50 and the pipe box 52.

Continuing with FIGS. 2 and 3, the drill rig 14 is typically anchored to the ground surface 16 during a drilling operation using a set of anchors 56 and stabilizers 58. Anchoring the drill rig 14 provides a stable platform for thrust and pullback of the drill string 22 and downhole tool 28 during operation. However, because the drill rig 14 is anchored to the ground surface 16, there is little air flow over the drill rig's exhaust processing system 20 when the engine is shut down.

Figure 5:
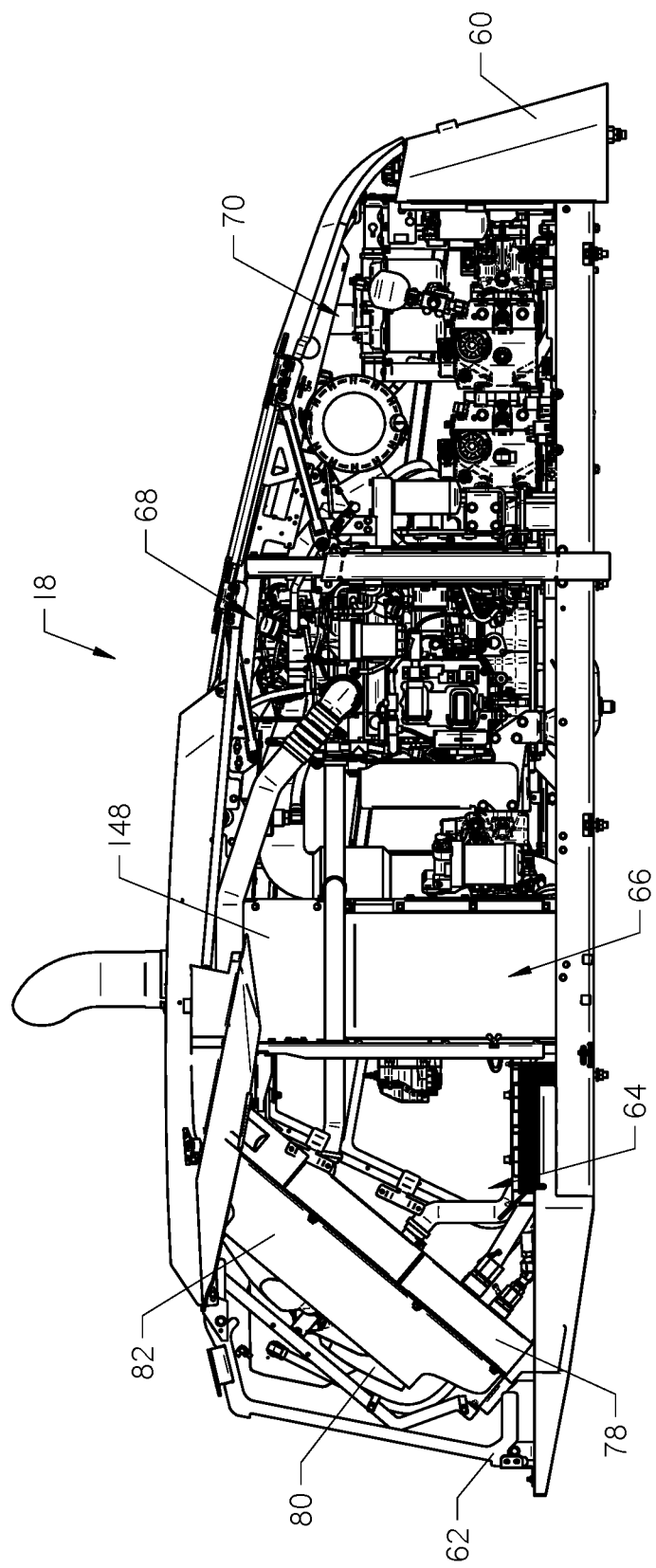
FIG. 5 is the elevational view of the first side view of the engine compartment shown in FIG. 4, but more lateral panels and the rear cover have been removed. The lateral barrier, which is shown removed in FIG. 4, is shown in FIG. 5.

Referring now to FIGS. 4 and 5, the engine compartment 18 has opposed first and second ends 60 and 62 and comprises a series of enclosures situated in a horizontally-spaced side-by-side relationship. A radiator enclosure 64 is positioned at the second end 62 of the engine compartment 18, followed by an exhaust enclosure 66, an engine enclosure 68, and a pump stack enclosure 70. The pump stack enclosure 70 is positioned at the first end 60 of the engine compartment 18. The engine compartment 18 is supported on the frame 34 of the drill rig 14 such that its first end 60 is closest to the operator station 42, as shown in FIG. 2.

Continuing with FIG. 4, the radiator enclosure 64 is separated from the exhaust enclosure 66 by a first barrier 72. The exhaust enclosure 66 is separated from the engine enclosure 68 by a second barrier 74. The barriers 72 and 74 may each comprise a metal plate with a layer of sound and/or heat insulation. The barriers 72 and 74 help to limit the conduction and convection of heat between the enclosures 64, 66, and 68. The engine enclosure 68 is separated from the pump stack 70 by a support structure 76. The support structure 76 may have a central opening that allows components to easily pass between the engine enclosure 68 and the pump stack enclosure 70.

Continuing with FIGS. 4 and 5, the radiator enclosure 64 contains a radiator 78 joined to a fan 80 by a cowling 82. The exhaust enclosure 66 contains the exhaust processing system 20, as shown in FIG. 4, and the engine enclosure 68 contains an engine 84. The pump stack enclosure 70 contains one or more hydraulic pumps used for powering the drill rig's hydraulically powered systems.

Figure 6:
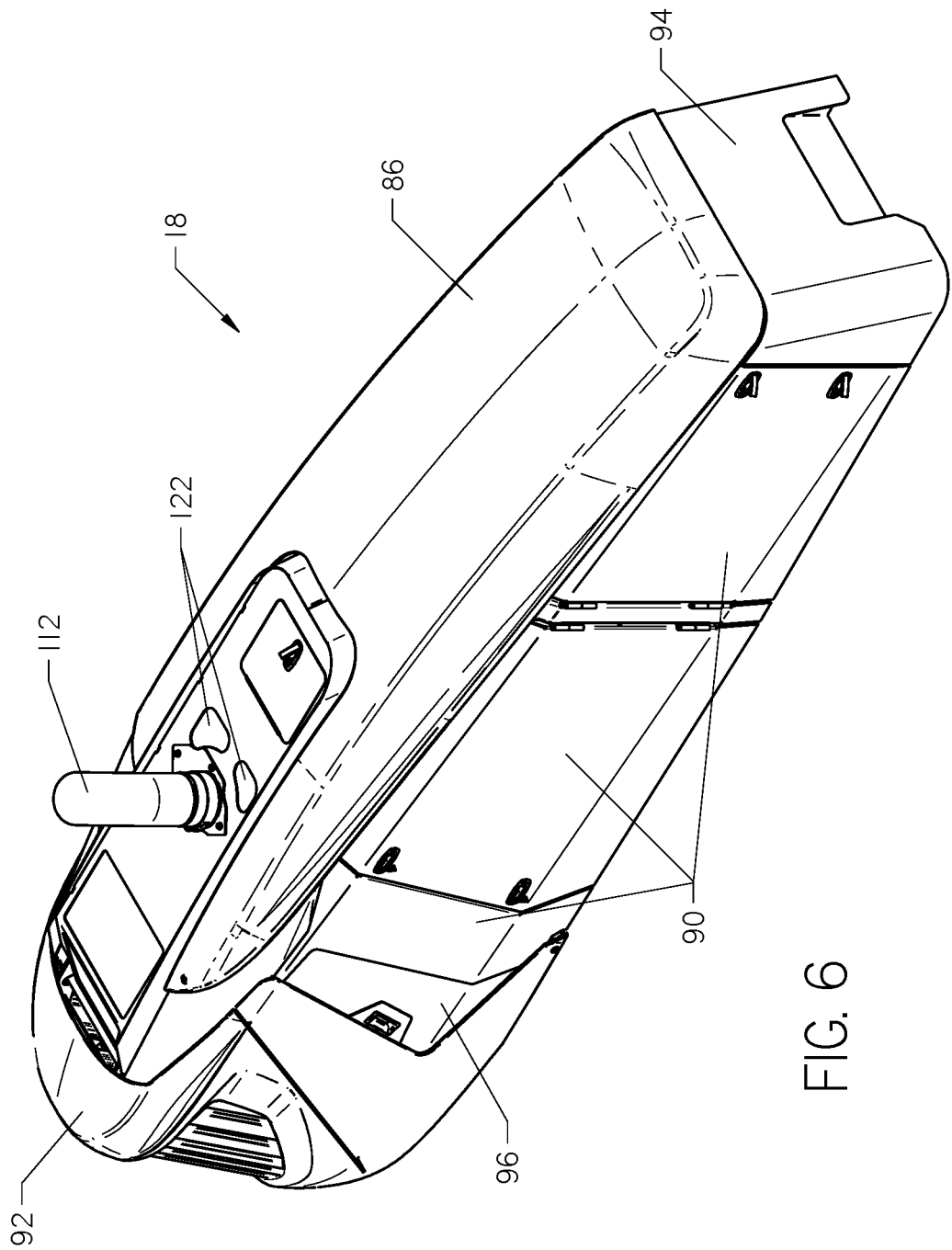
FIG. 6 is a top perspective view of the first side of the engine compartment shown in FIG. 2.
Figure 7:
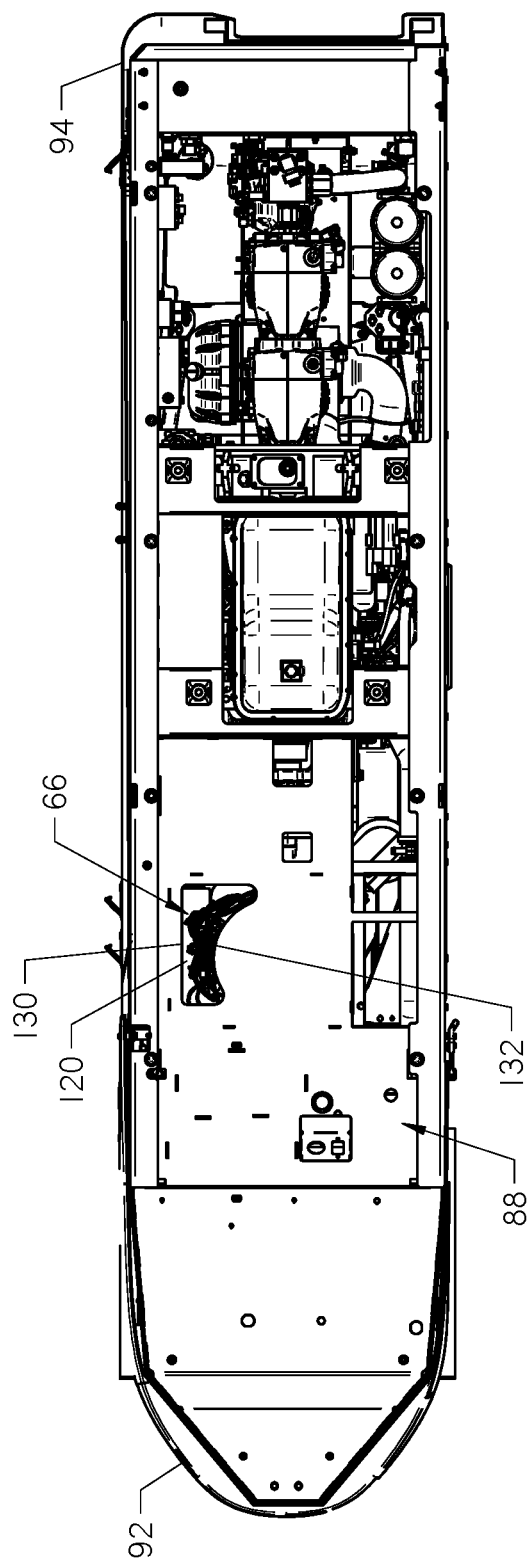
FIG. 7 is a bottom plan view of the engine compartment shown in FIG. 2.
Figure 8:
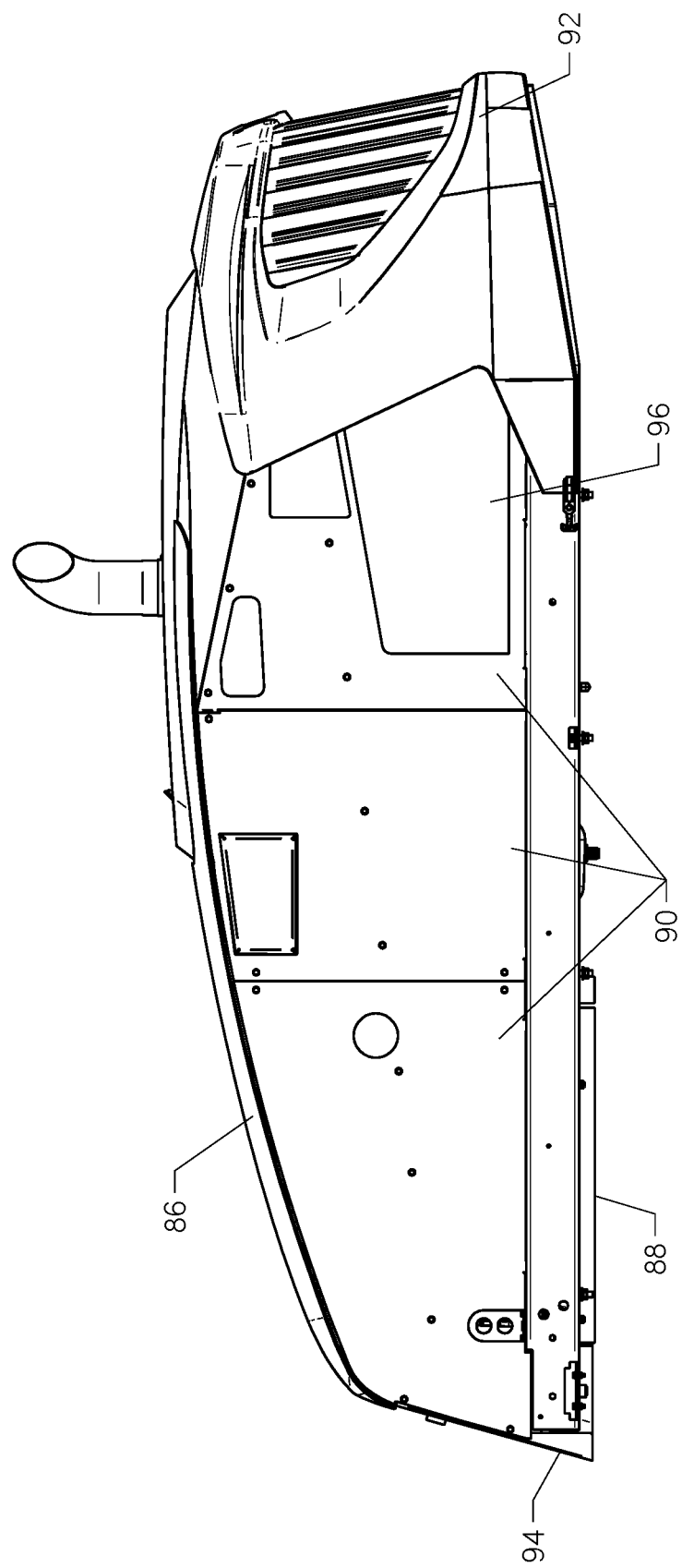
FIG. 8 is an elevational view of the second side of the engine compartment shown in FIG. 2.

With reference to FIGS. 6-8, the enclosures 64, 66, 68, and 70 are bounded in part by spaced upper and lower panels 86 and 88. Each panel 86 and 88 extends between the first and second ends 60 and 62 of the engine compartment 18 and may comprise one or more pieces. A portion of each panel 86 and 88 forms an upper and lower boundary of each enclosure 64, 66, 68, and 70. One or more openings may be formed in the portions of the lower panel 88 covering the radiator, engine, and pump stack enclosures 64, 68, and 70. Such openings provide space for hoses or other lines to pass through. An opening 120 is also formed in the portion of the lower panel 88 covering the exhaust enclosure 66. As will be described in more detail herein, the opening 120 is used to cool the exhaust enclosure 66 once the engine 84 is shut down and the fan 80 is no longer operating.

Continuing with FIGS. 6-8, the upper and lower panels 86 and 88 are joined by a plurality of lateral panels 90 and rear and front covers 92 and 94, as shown in FIGS. 6 and 8. The lateral panels 90 may include one or more screens 96 for providing air flow to the engine compartment 18. The rear cover 92 partially encloses the radiator enclosure 64, and the front cover 94 partially encloses the pump stack enclosure 70, as shown in FIG. 4.

Continuing with FIG. 4, the engine 84 is configured to propel the drill rig 14 and uses diesel as its fuel. As discussed above, exhaust from the engine 84 must be treated before it is released into the surrounding atmosphere to reduce harmful NOx emissions. The exhaust is chemically treated by the exhaust processing system 20 which is configured to generate a treated fluid stream.

Figure 9:
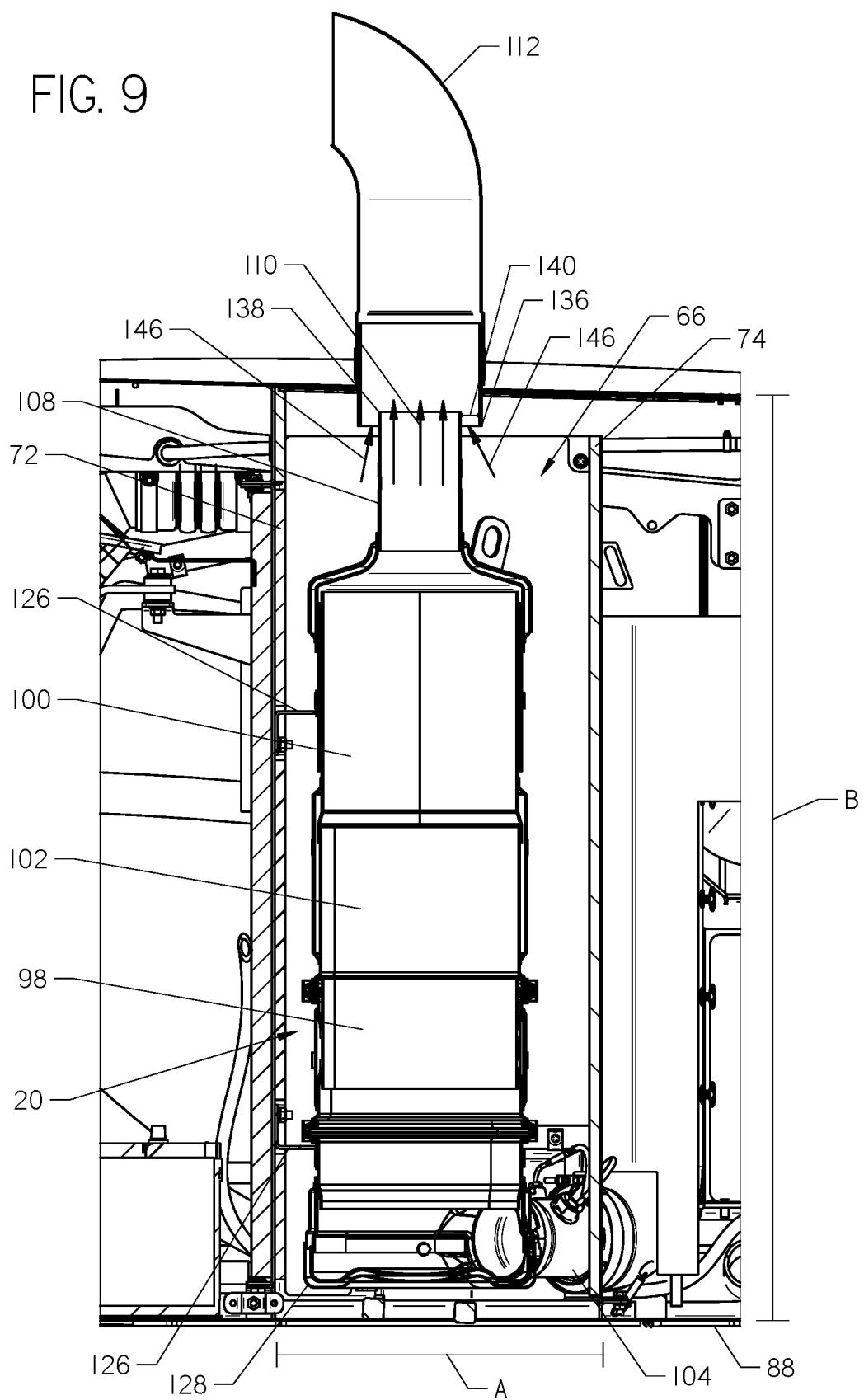
FIG. 9 is an enlarged cross-sectional view of the exhaust enclosure and exhaust processing system shown in FIG. 4.

With reference to FIG. 9, the exhaust enclosure 66 has a horizontal width A and a vertical height B. The vertical height B exceeds the horizontal width A, which allows the exhaust processing system 20 to be oriented vertically within the exhaust enclosure 66. The exhaust processing system 20 comprises a Diesel Oxidation Catalyst (DOC) chamber 98 joined to a Selective Catalytic Reduction (SCR) chamber 100. A Decomposition Reaction Tube (DRT) 102 is positioned between the DOC chamber 98 and the SCR chamber 100. The exhaust processing system 20 also comprises one or more particulate filters and features for exhaust sound attenuation or muffling.

Figure 10:
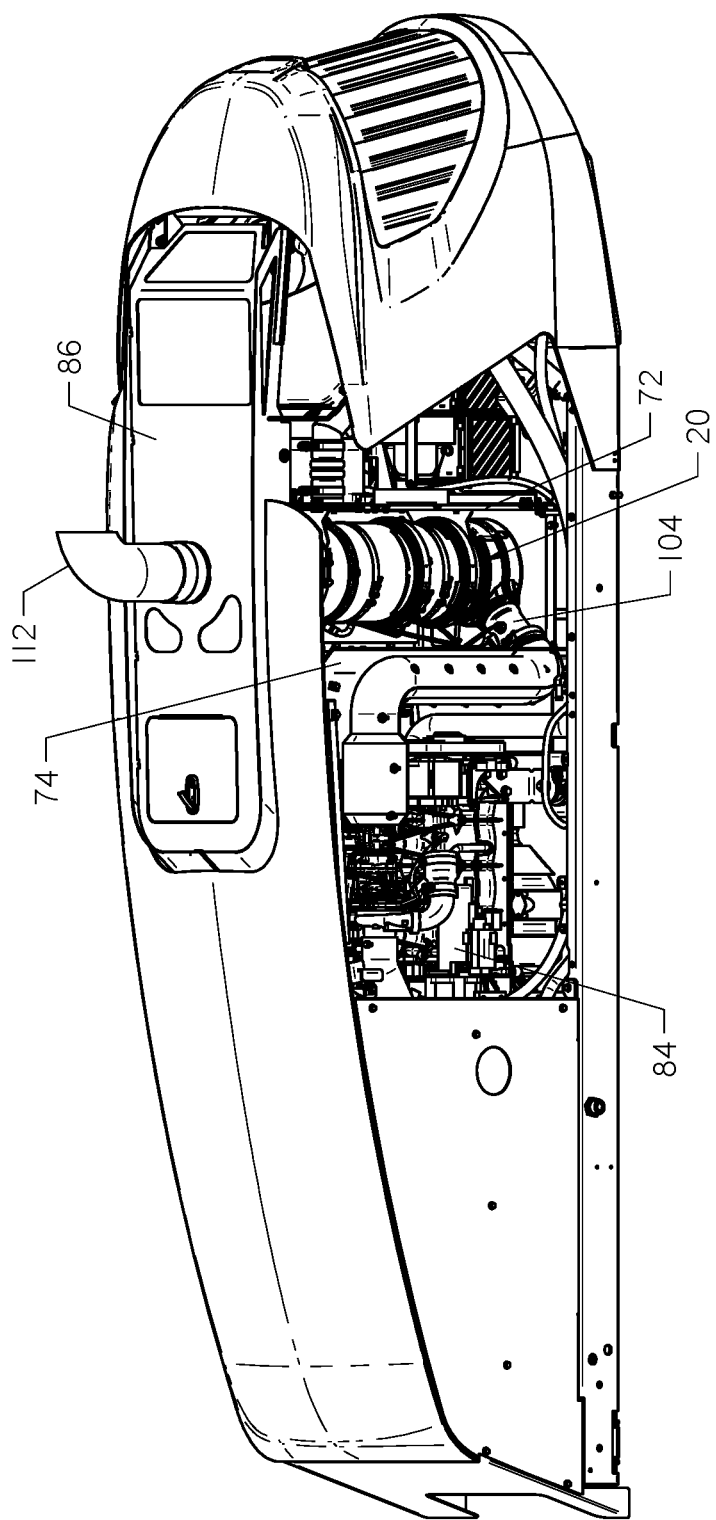
FIG. 10 is a perspective view of the second side of the engine compartment shown in FIG. 2. A portion of the lateral panels and a lateral barrier have been removed to expose the components situated within the engine compartment.

In operation, exhaust from the engine 84 is delivered to the exhaust processing system 20 via a conduit 104 that passes through the second barrier 74, as shown in FIGS. 9 and 10. The exhaust is directed to the DOC chamber 98 upon entry into the exhaust processing system 20. The DOC chamber 98 promotes oxidation of any unburned diesel fuel in order to prepare the exhaust for treatment within the SCR chamber 100. From the DOC chamber 98, the exhaust gas flows towards the SCR chamber 100.

Diesel Exhaust Fluid (DEF) is injected into the DRT 102 through a dosing module 106, shown in FIG. 4. As discussed above, the DEF reacts with a catalyst in the DRT 102, causing the DEF to vaporize and decompose so as to form carbon dioxide (CO2) and ammonia (NH3). The NOx from the exhaust reacts with the ammonia inside of the SCR chamber 100 and is reduced to nitrogen gas (N2) and water vapor, thereby creating the treated fluid stream.

Continuing with FIG. 9, the treated fluid stream is expelled from the exhaust processing system 20 through an exhaust discharge conduit 108 supported above the SCR chamber 100, as shown by the arrows 110. The exhaust discharge conduit 108 is in fluid communication with an exhaust stack 112 supported on the upper panel 86. The treated fluid stream is discharged into the ambient environment through the exhaust stack 112. As discussed above, the process of creating the treated fluid stream causes the temperature of exhaust gases to increase, increasing the temperature within the exhaust enclosure 66. A plurality of electronics 114 are supported on the side of the exhaust processing system 20 that control the operations of the system 20, as shown in FIG. 4. As discussed above, it is important to keep the electronics 114 cool so as to prevent them from overheating and malfunctioning.

Figure 11:
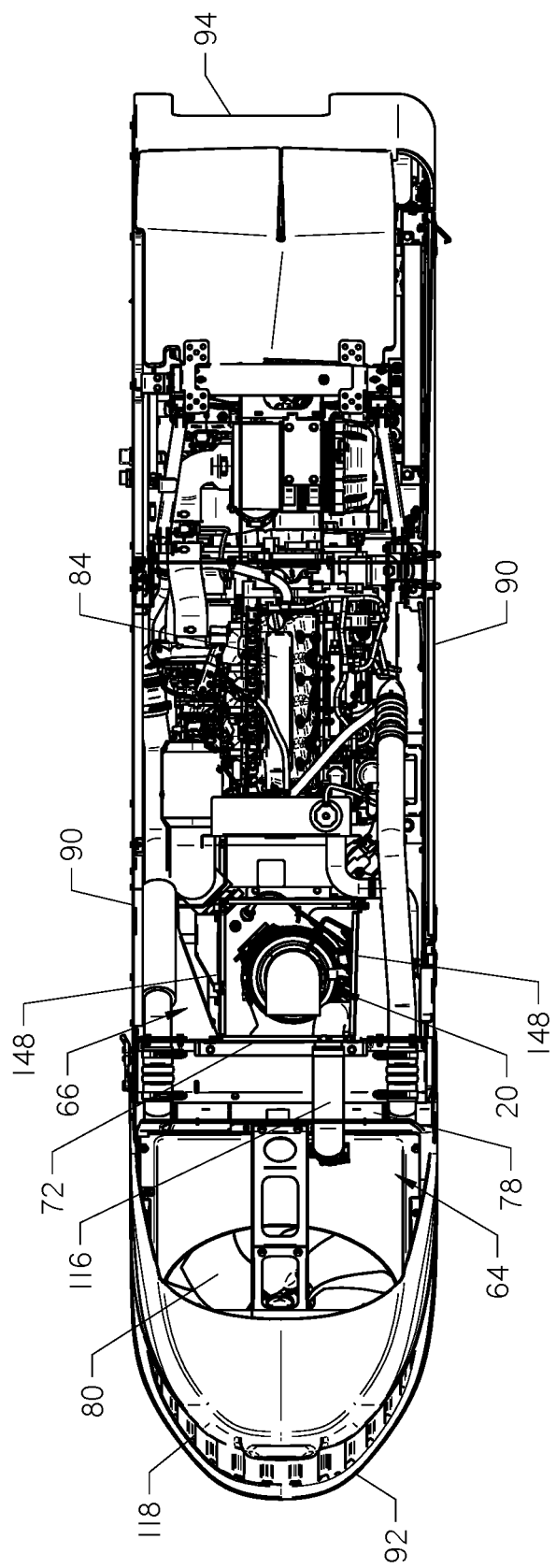
FIG. 11 is a top plan view of the engine compartment shown in FIG. 2. The upper panel has been removed to expose the components situated within the engine compartment.

With reference to FIG. 11, while the engine 84 is running, the fan 80 draws hot air surrounding the exhaust processing system 20 into the radiator enclosure 64 through a conduit 116 that passes through the first barrier 72. The conduit 116 bypasses the radiator 78 and directly connects the exhaust enclosure 66 and the fan 80. The fan 80 pushes the hot air out into the ambient environment through vents 118 formed in the rear cover 92. Hot air drawn away from the exhaust processing system 20 by the fan 80 helps to keep the electronics 114 cool. However, if the engine 84 and fan 80 are both shut down, hot air is no longer pulled from the exhaust enclosure 66 by the fan 80.

Figure 12:
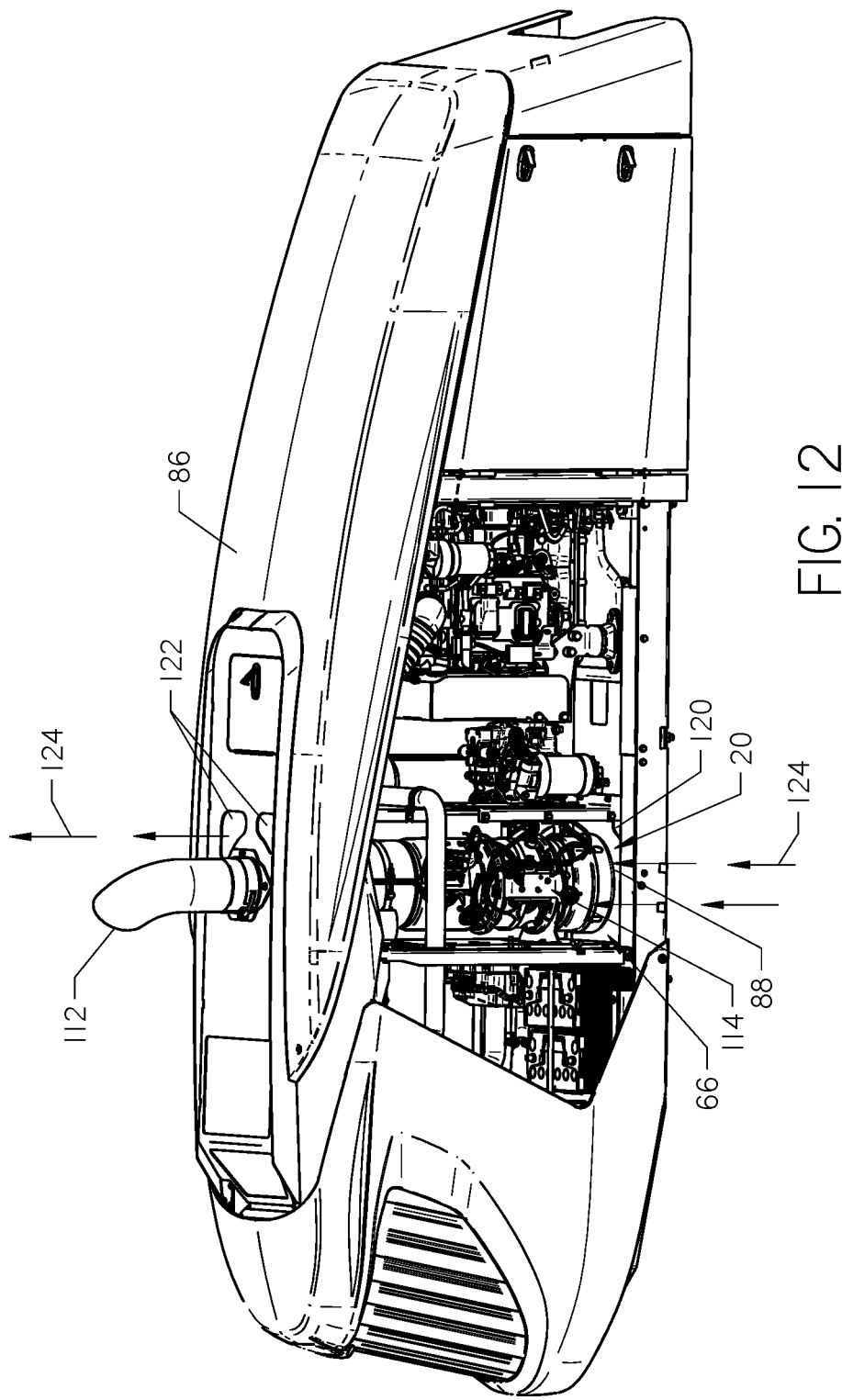
FIG. 12 is a top perspective view of the first side of the engine compartment shown in FIG. 4.

With reference to FIGS. 6, 7, and 12, in order to allow cool air to circulate within the exhaust enclosure 66 after the engine 84 and fan 80 are shut down, openings are formed in the upper and lower panels 86 and 88. At least one opening 120 is formed in the lower panel 88 of the exhaust enclosure 66, as shown in FIG. 7, and at least one opening 122 is formed in the upper panel 86, as shown in FIG. 6, of the exhaust enclosure 66. The openings 120 and 122 expose the interior of the exhaust enclosure 66 to the ambient environment surrounding the engine compartment 18.

Continuing with FIG. 12, cool ambient air is allowed to freely pass through the opening 120 in the lower panel 88 and into the exhaust enclosure 66. The air flows around the exhaust processing system 20 and exits the exhaust enclosure 66 through the opening 122 in the upper panel 86. Thus, the openings 120 and 122 are situated along an airflow path that extends through the exhaust enclosure 66, as shown by the arrows 124. Air flowing along the path creates a convection chamber within the exhaust enclosure 66.

Allowing ambient air to enter the exhaust enclosure 66 and circulate around the exhaust processing system 20 significantly reduces the temperature of the air within the exhaust enclosure 66, thereby protecting the electronics 114 from overheating. For example, the temperature within an exhaust enclosure not having the disclosed openings 120 and 122 may increase 140 to 170 degrees Fahrenheit from the time the engine and fan are shut down. In contrast, the temperature within the exhaust enclosure 66 having the openings 120 and 122 may only increase 8 to 10 degrees Fahrenheit from the time the engine and fan are shut down. Air flows along the airflow path that extends through the exhaust enclosure 66 until a temperature equilibrium is reached between ambient air and air within the exhaust enclosure 66.

Turning back to FIG. 9, the exhaust processing system 20 is attached to the first barrier 72 via a set of brackets 126. The exhaust processing system 20 is attached to the first barrier 72 such that a lower end 128 of the system 20 is vertically-spaced from and suspended above the lower panel 88. Thus, a gap may exist between the lower end 128 of the exhaust processing system 20 and the lower panel 88. The gap may have a height of no less than one inch. Air passing through the opening 120 in the lower panel 88 may flow around the lower end 128 of the exhaust processing system 20 and towards the electronics 114.

Turning back to FIGS. 7 and 12, the opening 120 formed in the lower panel 88 may be fairly large so as to facilitate the free flow of ambient air into the exhaust enclosure 66. For example, the opening 120 may take up at least one-fourth of the surface area of the lower panel 88 of the exhaust enclosure 66. A first side 130 of the opening 120 may extend the width A, shown in FIG. 9, of the exhaust enclosure 66, and a second side 132 of the opening 120 may extend around a footprint of the lower end 128 of the exhaust processing system 20. In alternative embodiments, the opening 120 may have different shapes and sizes or may take up more or less surface area of the lower panel 88. In further alternative embodiments, a plurality of openings may be formed in the lower panel of the exhaust enclosure.

With reference to FIGS. 6 and 12, the opening 120 formed in the upper panel 86 may be at least partially aligned with the opening 120 formed in the lower panel 88, as shown in FIG. 12. The opening 122 may also be one of a plurality of openings 122 formed in the upper panel 86 of the exhaust enclosure 66. Two openings 122 are shown in FIGS. 6 and 12. The openings 122 are positioned around the exhaust stack 112 and have the shape of a triangle having rounded corners. In alternative embodiments, the opening 122 may have different shapes or sizes, as desired. While not shown, the openings 120 and 122 may each be covered by a screen so as to limit debris from entering the exhaust enclosure 66.

Figure 13:
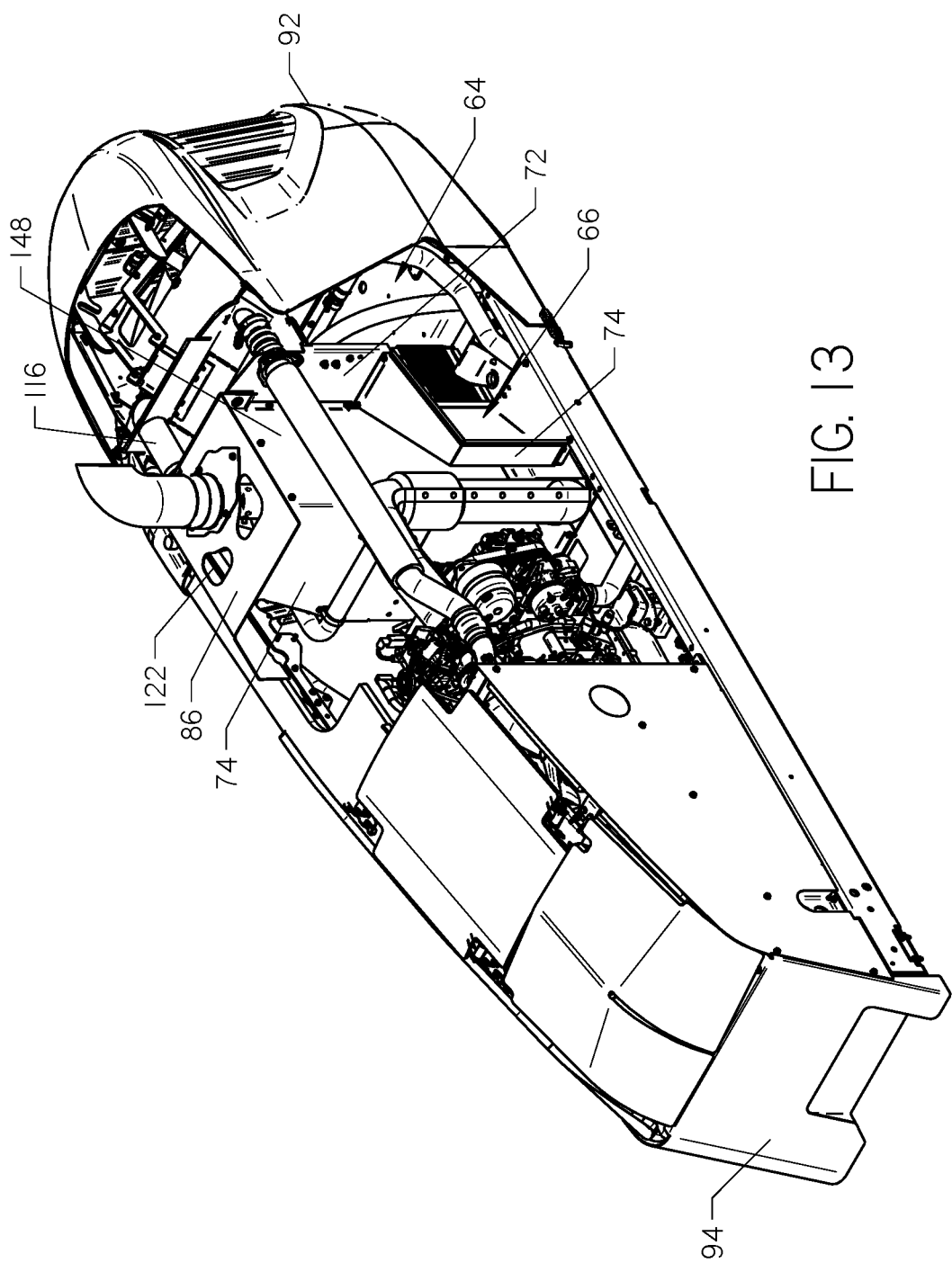
FIG. 13 is a top perspective view of the first side of the engine compartment shown in FIG. 10. A portion of the upper panel has been removed to expose the components situated within the engine compartment.

With reference to FIGS. 5, 11, and 13, the exhaust enclosure 66 may be further bounded by a set of lateral barriers 148. The lateral barriers 148 interconnect the first and second barriers 72 and 74 such that a barrier is positioned on each side of the exhaust enclosure 66. The lateral barriers 148 are positioned between the exhaust processing system 20 and the lateral panels 90, as shown in FIG. 11. The lateral barriers 148 further limit the size of the exhaust enclosure 66. The exhaust enclosure 66 is preferably not much larger than the exhaust processing system 20. Limiting the size of the exhaust enclosure 66 promotes the convection of air within the enclosure 66 once the engine 84 is shut down and the fan 80 is no longer operating.

Continuing with FIGS. 5, 11, and 13, space is provided between the lateral barriers 148 and the lateral panels 90 to allow any needed hoses or electrical lines to pass between the radiator and engine enclosures 64 and 68 and around the exhaust enclosure 66. The lateral barriers 148 may be curved or bent, as needed, to provide more space. At least one of the lateral barriers 148 may be removable in order to service the exhaust processing system 20 or interior of the exhaust enclosure 66, as needed.

The lateral barriers 148, like the first and second barriers 72 and 74 may each comprise a metal plate with a layer of sound and/or heat insulation. The insulation of the surface of the barriers 72, 74, and 148 facing the interior of the exhaust enclosure 66 may be non-reflective so as to not reflect heat towards the electronics 114. The lateral barriers 148 help to further limit the conduction and convection of heat between the enclosures 64, 66, 68, and 70. One or more of the screens 96 may be positioned adjacent to one or both lateral barriers 148 so as to allow ambient air to be pulled into the engine compartment 18 by the fan 80.

Continuing with FIG. 12, the exhaust processing system 20 and exhaust enclosure 66 disclosed herein are also configured to increase air flow within the exhaust enclosure 66 when the engine 84 and fan 80 are both running. For example, when the fan 80 is running, cool ambient air is pulled into the exhaust enclosure 66 from both of the openings 120 and 122, thereby increasing air flow within the enclosure 66. The cool air is drawn into the exhaust enclosure 66 through the openings 120 and 122 by the fan 80 using the conduit 116, shown in FIG. 11. The conduit 116 is situated such that its opening 134, shown in FIG. 4, is positioned above and spaced from the electronics 114. For example, the opening 134 may be positioned about one-third of the way down the height B, shown in FIG. 9, of the exhaust enclosure 66 from the upper panel 86. Because the opening 134 is positioned above and spaced from the electronics 114, cool air flowing from the opening 120 in the lower panel 88 flows around the electronics 114 before it passes into the opening 134 of the conduit 116.

Turning back to FIG. 9, the exhaust stack 112 and exhaust discharge conduit 108 are configured to further increase air flow within the exhaust enclosure 66 when the engine 84 is running. The exhaust stack 112 extends partially into the exhaust enclosure 66 such that its lower opening 136 is disposed above the exhaust processing system 20. The exhaust discharge conduit 108 extends upwards within the exhaust enclosure 66 and its upper opening 138 is disposed within the lower opening 136 of the exhaust stack 112. A diameter of the lower opening 136 is greater than a diameter of the upper opening 138 such that a gap 140 exists between an inner surface of the exhaust stack 112 and an outer surface of the exhaust discharge conduit 108.

The mismatched size of the upper and lower openings 138 and 136 creates a Venturi effect or pressure differential within the exhaust enclosure 66 as the treated fluid stream flows from the exhaust discharge conduit 108 into the exhaust stack 112. The pressure differential cause air within the exhaust enclosure 66 to be pulled into the exhaust stack 112 through the gap 140, as shown by arrows 146. Allowing air within the exhaust enclosure 66 to flow into the exhaust stack 112 helps to further increase air flow within the exhaust enclosure 66.

Figure 14:
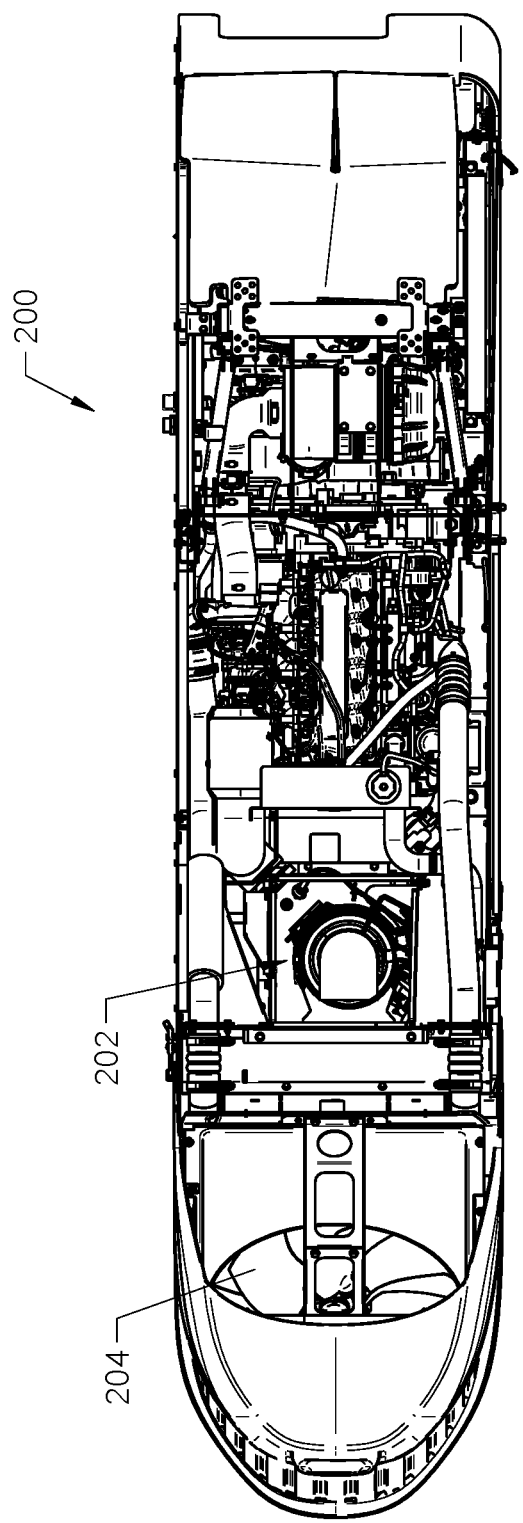
FIG. 14 is a top plan view of an alternative embodiment of an engine compartment. The upper panel has been removed to expose the components situated within the engine compartment.

With reference to FIG. 14, an alternative embodiment of an engine compartment 200 is shown. The engine compartment 200 is identical to the engine compartment 18 shown in FIG. 11, with the exception that it does not have a conduit that directly connects its exhaust enclosure 202 and a fan 204. Because such conduit has been removed, the primary method of cooling within the exhaust enclosure 202 is the flow of air from the openings in the upper and lower panels, of the exhaust enclosure 202, as described above. Thus, cooling by convection is the primary method of cooling within the exhaust enclosure 202. The size of the openings formed in the upper and lower panels of the exhaust enclosure 202 may be increased from those formed in the exhaust enclosure 66, shown in FIG. 12, in order to increase the convection of air within the enclosure 202.

While the exhaust enclosures 66 and 202 and exhaust processing system 20 disclosed herein have been described for use with a horizontal directional drill rig 14, a skilled artisan will recognize that the invention disclosed herein is not limited to such use. For example, tractors or other known work machines may be configured to use the exhaust enclosure 66 and exhaust processing system 20 disclosed herein.

Changes may be made in the construction, operation and arrangement of the various parts, elements, steps and procedures described herein without departing from the spirit and scope of the invention as described herein.

The invention claimed is:

1. A self-propelled machine situated in an ambient environment, comprising:
   an engine compartment housing an engine and an exhaust processing system;
   in which the engine is configured to propel the machine;
   in which the exhaust processing system is in fluid communication with the engine and is configured to chemically treat the engine's exhaust and generate a treated fluid stream; and
   an exhaust stack in fluid communication with the exhaust processing system and discharging into the ambient environment;
   in which the engine compartment comprises an exhaust enclosure that contains the exhaust processing system, the exhaust enclosure bounded by spaced and opposed upper and lower panels, each of said panels exposed to the ambient environment and having at least one opening formed therein, the openings distinct from any opening associated with the exhaust stack and situated along an airflow path that extends through the exhaust enclosure.

2. The self-propelled machine of claim 1, in which the engine and the exhaust processing system are situated in a horizontally-spaced, side-by-side relationship within the engine compartment.

3. The self-propelled machine of claim 1, further comprising:
   a radiator in fluid communication with the engine;
   in which the engine compartment further comprises:
      a radiator enclosure that contains the radiator; and
   in which the engine, exhaust processing system, and radiator are situated in a horizontally-spaced, side-by-side relationship within the engine compartment.

4. The self-propelled machine of claim 3, in which the engine compartment further comprises:
   an engine enclosure that contains the engine; and
   a conduit housed within the engine compartment and interconnecting the engine enclosure and the radiator enclosure.

5. The self-propelled machine of claim 1, in which the exhaust processing system is vertically-spaced above the lower panel.

6. The self-propelled machine of claim 5, in which the exhaust processing system is attached to a side wall of the exhaust enclosure.

7. The self-propelled machine of claim 5, in which a separation distance between the exhaust processing system and the lower panel is no less than one inch.

8. The self-propelled machine of claim 1, in which the exhaust enclosure comprises a plurality of side walls positioned intermediate the upper and lower panels, in which each of the plurality of side walls comprises a heat insulating material.

9. A system comprising:
the self-propelled machine of claim 1, in which the engine is shut down; and
a current of air flowing along the airflow path.

10. The self-propelled machine of claim 1, in which the exhaust enclosure has a vertical height and a horizontal width, and in which the vertical height exceeds the horizontal width.

11. The self-propelled machine of claim 1, in which the opening formed in the upper panel is one of a plurality of openings formed in the upper panel that are distinct from any opening associated with the exhaust stack and are situated along the airflow path.

12. The self-propelled machine of claim 1, further comprising:
an exhaust discharge conduit interconnecting the exhaust system and the exhaust stack, at least a portion of the exhaust stack extending within the exhaust enclosure and an interior of the exhaust stack being in fluid communication with airflow within the exhaust enclosure.

13. The self-propelled machine of claim 12, in which the discharge conduit is disposed within a lower opening of the exhaust stack; and in which a diameter of the lower opening is greater than an outer diameter of the discharge conduit such that a gap exists between an inner surface of the exhaust stack and an outer surface of the discharge conduit and the inner surface of the exhaust stack is in a spaced-relationship with the outer surface of the discharge conduit.

14. The self-propelled machine of claim 1, further comprising:
a conduit housed within the engine compartment and interconnecting the engine and the exhaust processing system.

15. The self-propelled machine of claim 1, in which at least a portion of the upper panel is positioned parallel to at least a portion of the lower panel.

16. A system, comprising:
the self-propelled machine of claim 12;
air flowing into the exhaust enclosure through the opening formed in the lower panel;
air flowing into the exhaust enclosure through the opening formed in the upper panel;
air within the exhaust enclosure flowing into the exhaust stack; and
the treated fluid stream flowing from the discharge conduit into the exhaust stack.

17. A system comprising:
the self-propelled machine of claim 1;
a downhole tool positioned within an underground borehole; and
a drill string having opposed first and second ends, in which the first end is supported by the machine and the second end is attached to the downhole tool.

18. A system, comprising:
a drill rig situated in an ambient environment, comprising:
an engine compartment housing an engine and an exhaust processing system;
in which the engine is configured to propel the drill rig;
in which the exhaust processing system is in fluid communication with the engine and is configured to chemically treat the engine's exhaust and generate a treated fluid stream; and
in which the engine compartment comprises an exhaust enclosure that contains the exhaust processing system, the exhaust enclosure bounded by spaced and opposed upper and lower panels, each of said panels exposed to the ambient environment and having at least one opening formed therein; and
air from the ambient environment flowing into the exhaust enclosure through the opening formed in the lower panel, flowing around the exhaust processing system, and flowing out of the exhaust enclosure and back into the ambient environment through the opening formed in the upper panel.

19. The system of claim 18, in which the engine is shut down.

20. The system of claim 18, in which the drill rig supports a pipe box configured to house a plurality of pipe sections.

21. The system of claim 18, in which the exhaust processing system is vertically-spaced above the opening formed in the lower panel.

22. A self-propelled machine situated in an ambient environment, comprising:
an engine configured to propel the machine;
an exhaust processing system in fluid communication with the engine and configured to chemically treat the engine's exhaust and generate a treated fluid stream;
an exhaust stack in fluid communication with the exhaust processing system and discharging into the ambient environment; and
an exhaust enclosure that contains the exhaust processing system, the exhaust enclosure bounded by spaced upper and lower panels, each of said panels exposed to the ambient environment and having at least one opening formed therein, the openings distinct from any opening associated with the exhaust stack and situated along an airflow path that extends through the exhaust enclosure;
in which the exhaust enclosure comprises a plurality of side walls positioned intermediate the upper and lower panels, in which each of the plurality of side walls comprises a heat insulating material.

* * * * *